(12) United States Patent
    Baltimore

(10) Patent No.: US 9,978,073 B2
(45) Date of Patent: May 22, 2018

(54) SYSTEM AND METHOD OF ADVERTISING AND MARKETING

(76) Inventor: Jordan Scott Baltimore, New York, NY (US)

( * ) Notice: Subject to any disclaimer, the term of this patent is extended or adjusted under 35 U.S.C. 154(b) by 407 days.

(21) Appl. No.: 12/319,996

(22) Filed: Jan. 14, 2009

(65) Prior Publication Data

US 2009/0182623 A1    Jul. 16, 2009

Related U.S. Application Data

(60) Provisional application No. 61/011,098, filed on Jan. 15, 2008.

(51) Int. Cl.
*G06Q 30/00* (2012.01)
*G06Q 30/02* (2012.01)

(52) U.S. Cl.
CPC ......... *G06Q 30/02* (2013.01); *G06Q 30/0261* (2013.01); *G06Q 30/0251* (2013.01); *G06Q 30/0255* (2013.01)

(58) Field of Classification Search
CPC ........................ G06Q 30/0251; G06Q 30/0255

USPC ............... 705/10, 14, 14.49, 14.53; 345/2.3; 382/183
See application file for complete search history.

(56) References Cited

U.S. PATENT DOCUMENTS

| | | | | |
|---|---|---|---|---|
| 4,962,466 | A * | 10/1990 | Revesz et al. | 705/14.47 |
| 6,089,453 | A * | 7/2000 | Kayser et al. | 235/383 |
| 6,181,299 | B1 * | 1/2001 | Frederick et al. | 345/2.1 |
| 7,287,001 | B1 * | 10/2007 | Falls et al. | 705/22 |
| 2002/0005775 | A1 * | 1/2002 | Sonnendorfer et al. | 340/5.91 |
| 2002/0109593 | A1 * | 8/2002 | Swartzel et al. | 340/540 |
| 2003/0136832 | A1 * | 7/2003 | Massaro | 235/383 |
| 2008/0059297 | A1 * | 3/2008 | Vallier et al. | 705/14 |
| 2008/0095441 | A1 * | 4/2008 | Rosskamm et al. | 382/183 |
| 2008/0249859 | A1 * | 10/2008 | Angell et al. | 705/14 |
| 2008/0255894 | A1 * | 10/2008 | Falls et al. | 705/7 |
| 2010/0007579 | A1 * | 1/2010 | Minowa | 345/2.3 |

* cited by examiner

*Primary Examiner* — A Hunter Wilder

(57) ABSTRACT

The invention relates to an improved advertising and marketing system and method that includes a data terminal for communicating information over a communication network and a display terminal for displaying information related to first and second products that are being offered for sale. The invention also relates to the measurement and specific sales and marketing that can be performed as a result of the information gathered by the data terminals.

9 Claims, 5 Drawing Sheets

SYSTEM AND METHOD OF ADVERTISING AND MARKETING

CROSS REFERENCE TO RELATED APPLICATIONS

This application claims priority to Provisional Application 61/011,098 filed on Jan. 15, 2008.

STATEMENT REGARDING FEDERALLY SPONSORED RESEARCH OR DEVELOPMENT

Not applicable.

REFERENCE TO SEQUENCE LISTING, A TABLE, OR A COMPUTER PROGRAM LISTING COMPACT DISC APPENDIX

Not applicable.

FIELD OF THE INVENTION

This invention relates generally to a system and method for electronic product information display systems. More specifically, the invention relates to an improved marketing and advertising system and method that includes a data terminal for communicating information over a communication network and a display terminal for displaying information related to products that are being offered for sale, and for measuring customers' interaction with these displays in a retail location.

BACKGROUND OF THE INVENTION

Paper shelf tags have long been used to display pricing information in association with the shelving on which various products are displayed for purchase. The tag provides product information, pricing information, bar codes which can be used for inventory control, as well as other information. While paper shelf tags are ubiquitous, they are somewhat cumbersome in use. Moving product location on a shelf requires removal of the tag. Updating of pricing also requires tag removal and or replacement. These characteristics of the shelf tag also result in the risk that the replacement tag is not placed in the correct location, that the replacement is not done promptly, or that the replacement is not accurate.

The above limitations have been overcome by the development and use of electronic shelf tags. Such tags utilize an electronic display, such as a liquid crystal display (LCD), display driver circuitry, programming interface circuitry, and other miscellaneous control circuitry to provide for the display of information relative to a product associated with the tag. Such electronic displays can display the same information as that provided by a paper shelf tag and can be updated with new information from a source that communicates with the display tag via wired or wireless communication links. The information source can be a centralized computer system and database that is disposed in the retail selling location or connected to such location via a communications network, including the Internet. Or, the source can be a portable hand-held device that is brought to a location proximate to the tag to be updated and couples its updating information to the tag via a wired or wireless communications link.

Electronic tags can also be used to provide cross-promotional messages or advertising for products other than that whose product description and price, etc. are being displayed by the tag. For purposes of this application, the subject matter of such cross-promotional messages or advertising shall be referred to as "second products" to distinguish them from the "first products" whose product information and pricing are also being displayed by the tag. So, for example, a display that displays information and pricing about digital cameras, i.e., the first product, could also provide cross-promotional messages or advertising about color printers, i.e., the second product, and the location of such second products. Another example might be one that displays a second product that is relatively unrelated to the first product, except for the shared target customer for both products. That is, a display that displays information and pricing about Apple ipods could also provide cross-promotional messages and advertising about BMWs. The obvious advantage is enhancing sales of the first and second products via targeted advertising to prospective purchasers of the first product. The relationship, however, in this example is a fixed one. The scope of the promotional advertising can be increased without significant decrease in benefit via knowledge of a prospective purchaser's demographic information or past shopping habits. So, for example, RFID tags carried by the prospective purchaser can be used to provide information about the purchasing history of a prospective purchaser. In this manner, the relationship between the first and second products can be dynamic and individualized to each prospective purchaser. The shortcoming of the use of RFID tags is that the wireless link is subject to noise and signal impairments and the prospective purchaser may not carry his tag at all times. It would be desirable if an arrangement could be devised that would permit a dynamic relationship between the second products and first products, one that would provide targeted messages geared to particular prospective purchasers in a manner that would increase sales of the products in a manner that would overcome the limitations of RFID tags.

Interaction between the customer and such an invention in a retail environment may also increase the information that a retailer or manufacturer can learn about prospective customers' shopping habits, interests and potential future transactions. The concept of "dialogue marketing" can be facilitated through the use of this invention by the acquisition and analysis of the customers' in-store shopping patterns.

BRIEF SUMMARY OF THE INVENTION

The invention combines the use of digital price tags and displays with advertising in a retail environment. In addition to being able to display dynamic pricing and content about a first product that is being merchandised, the invention relates to devices that display advertising and information in a dynamic fashion with respect to a second product as well.

One aspect of the invention relates to the displaying of information about the second product based on information obtained directly from the targeted purchaser through the use of interactive means. Utilizing this aspect of the invention, the purchaser provides information directly to the system by any known method of man-machine interaction. Such methods may include for example, a keyboard, a pointing device such as a mouse or trackball, a touch screen display, a voice recognition system or any other input type device, including cellular phones, PDAs or other commercially available handheld devices, owned by the customer or provided by the retailer.

Another aspect of the invention relates to the displaying of advertising information of the second product based on proprietary in-store and aggregated industry data from in-store market and/or industry research. Utilizing this aspect of the invention, a processing unit connected to a display will determine the second product to advertise based on the likelihood that a particular consumer at a particular time and date and for a first product will meet certain demographic criteria. The data collected and analyzed by the invention can then be used to formulate follow-up sales and marketing efforts by the retailer and the relevant vendors of the products.

BRIEF DESCRIPTION OF THE DRAWINGS

For a better understanding of the present invention, reference is made to the following description and accompanying drawings, while the scope of the invention is set forth in the appended claims:

DETAILED DESCRIPTION OF THE INVENTION

I. System Overview

Figure 1:
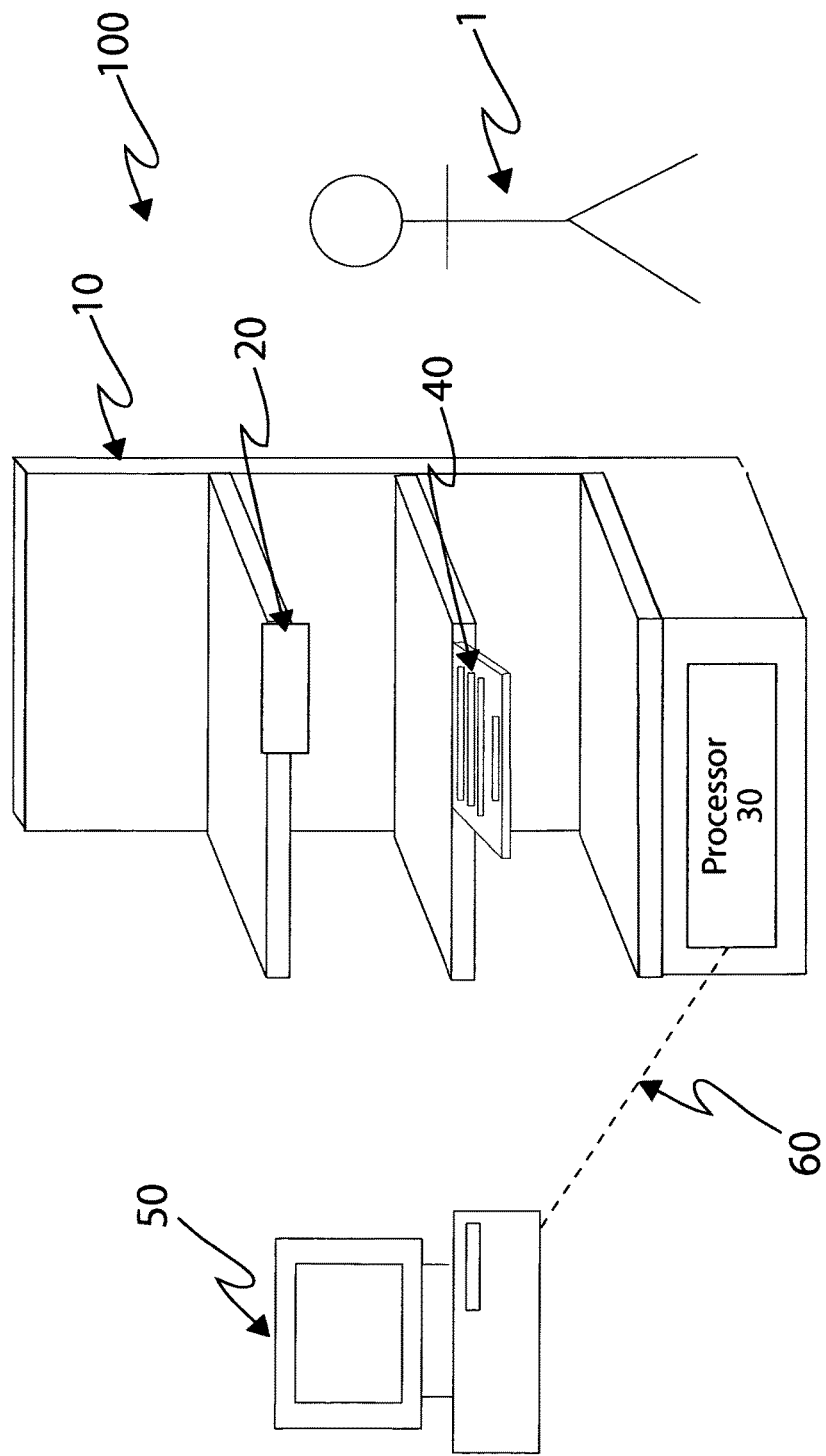
FIG. 1 shows a schematic diagram of an exemplary display system in accordance with the invention.

The present invention concerns electronic product information display systems. More specifically, the invention relates to an improved marketing and price tagging system that includes a data terminal for communicating information over a communication network and a display terminal for displaying information related to first and second products that are being offered for sale.

The disclosed electronic display tag system and methodology aspect of the present invention allows retailers to advantageously exploit electronic price tag displays by delivering targeted information to consumers and patrons in the general vicinity of the electronic tag display. This target information can be sent back to an electronic display in the vicinity of such consumers and patrons or subsequently such to such persons via conventional mail, email, text messaging or other communications means. Identifying such consumers and patrons and gathering their respective contact information can be done when signing up for a "loyalty program" or via prompts on the electronic display or by completion of a questionnaire followed by the distribution of RFID or other shopper identification tags that are carried about and may identify the carriers' whereabouts within the retailer's store as a function of time.

Referring to the drawings, like numbers indicate like parts throughout the views as used in the description herein, the meaning of "a," "an," and "the" includes plural reference unless the context clearly dictates otherwise. Also, as used in the description herein, the meaning of "in" includes both "in" and "on" unless the context clearly dictates otherwise. Also, as used in the description herein, the meanings of "and" and "or" include both the conjunctive and disjunctive and may be used interchangeably unless the context clearly dictates otherwise.

FIG. 1 shows display tag system 100. Display tag system 100 is comprised of product shelving 10, display tag 20, display processor 30, customer input device 40, main processor 50 and communications link 60.

The invention embodied by display system 100 allows a customer 1, in the area of display 20 to input requested information via input device 40 in response to specific prompts or queries displayed on display 20 regarding a second product. After receiving inputs from a user via input device 40, display 20, in addition to, or in conjunction with, displaying information about a first product, will also display information about a second product that was chosen by processor 30 or processor 50 in response to the user's inputs.

With respect to FIG. 1, product shelving 10 may be any general type of product display utilized in a retail environment as long as there is adequate room to mount display tag 20. Display tag 20 may be a liquid crystal display (LCD), organic LED (OLED) or any other type of commercially available display of sufficient size and shape to display alpha numeric and graphical images for the desired information. Additionally, display 20 may have multiple regions on which to display multiple independent pieces of information about a first product and a second product. Display 20 connects to display processor 30. As seen in FIG. 1 display processor 30 may be a general-purpose computer containing a central processing unit 32, a temporary memory 34, a permanent memory 36 and input and output device interfaces 38. Alternatively, display processor 30 may be a special purpose computer or processor designed to specifically interface with display 20, input device 40 and main processor 50.

Display processor 30 may act as an interface between main processor 50 display 20 and input device 40. Input device 40 is any known user input device, such as a keyboard, mouse, pointing device, microphone, cell phones, personal digital assistants (PDAs) or the like, as long as it allows a customer or user to input any relevant information required by display tag system 100. Input device 40 may even be a touch screen device integrated into display 20.

Main processor 50 may be a general purpose computer containing, a CPU 51, main memory 52, random access memory 53, input output devices 54, data entry device 55, and a display. It may be located proximate to display 20 or may be in a remote location. Main processor 50 communicates with display processor 30 via communications link 60. Communications link 60 may be a wired and/or wireless link between main processor 50 and display processor 30. Alternatively, main processor 50 and display processor 30 may reside in a single computer and may be run on a single CPU.

In operation, display 20 will display information regarding a first product that is located in close proximity to display 20. Alternatively, the first product, i.e. a commercially available laptop computer, may function as both the first product and as display 20. That is, the laptop computer, itself, is both on display in the store for sale or demonstration, and is also functioning as the invention. An exemplary display of information shown on display 20 for a first product will contain the first products unit price, quantity, or other relevant information the retailer or product manufacturer wishes to convey about the first product. When a user is within viewing distance of display 20, display 20 may, in addition to displaying information about a first product, also seek input from the consumer regarding a second product. For example, display 20 may prompt the user with questions regarding other similar types of products. Or, the prompts may request information about the purchaser, such as his age, likes/dislikes, or future contemplated purchases. In either case, the prompts may be in the form of queries displayed on display 20, or could be auditory prompts to the user. In response, a user may input a response to the prompts utilizing input device 40. Input device 40 is typically located proximate to display 20 and allows a user to respond to the prompts through one of a variety of well known inputting methods.

Once a user responds to the prompts from display 20, the response is conveyed to main processor 50 via display processor 30 and communication link 60. Main processor 50, using decision making processes based on the users' responses then selects the proper information regarding a second product to display back to the user via display 20. Alternatively, the information received from the user via input device 40 may be processed directly by display processor 30, and a determination regarding which second product to display may be reached without conveying the information to or from main processor 50.

Once the determination of which second product to display is reached, the information is conveyed to the customer via display 20. Using this invention, dynamic advertising messages based on specific user input may be advantageously displayed to the targeted consumer.

Figure 2:
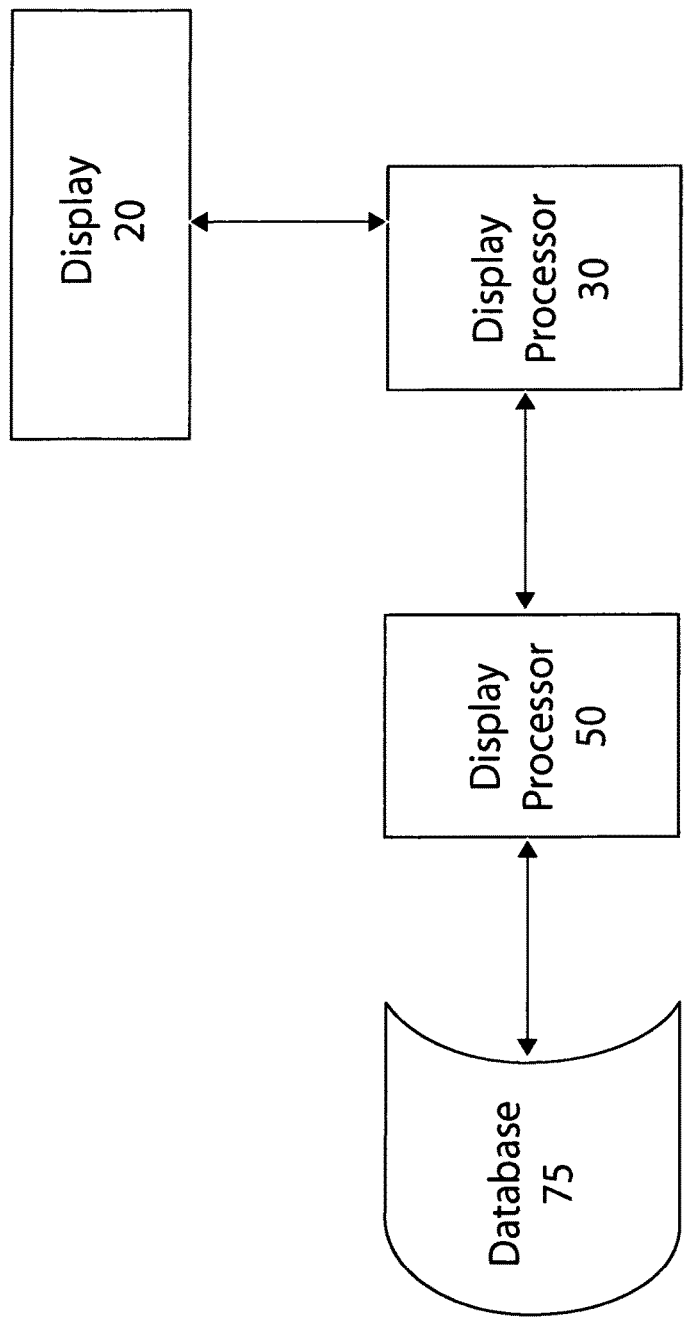
FIG. 2 shows a block diagram of an embodiment of a display system in accordance with the invention.
Figure 3:
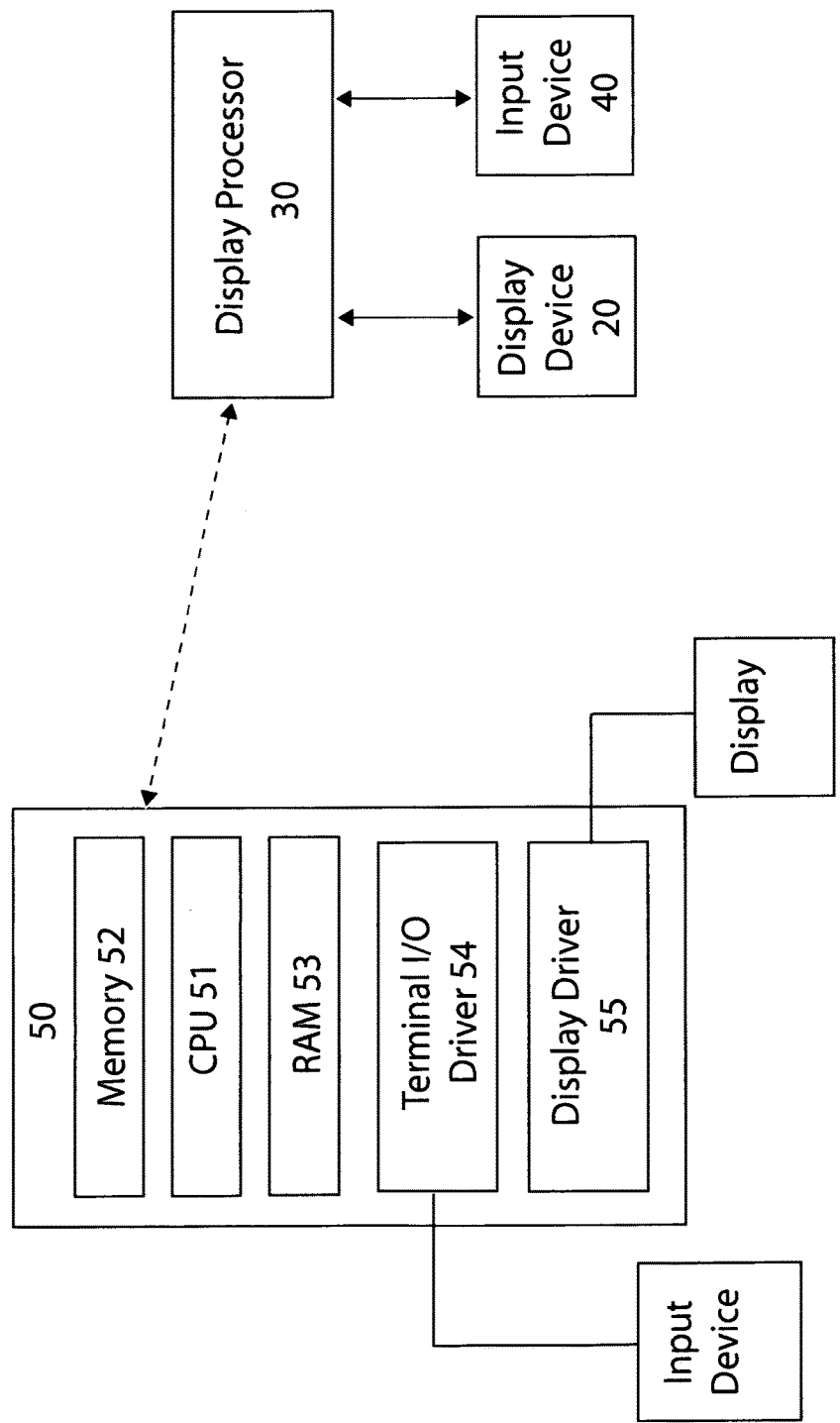
FIG. 3 shows a block diagram of an alternative embodiment of a display system in accordance with the invention.

FIG. 2 depicts another embodiment of the present invention that utilizes historical data to select the second product information to display. In this embodiment of the invention, main processor 50 makes a determination of the second product information to display based on historical data stored in database 75. Database 75 may store historical demographic information based on numerous consumers' past practices. For example, database 75 may store information about past consumer demographics based on certain key field indicators such as time, day of the week, first product characteristics, etc. Utilizing the historical results the system can search database 75 by utilizing the field indicators in the database and make a prediction of the demographics of a particular consumer at a particular time of day with respect to a particular product. For example, if gathered historical data indicates that a typical purchaser of a first product on a Tuesday between 9:00 a.m. and 11:00 a.m. is a 35-year-old female, then between 9:00 a.m. and 11:00 a.m. of each Tuesday, display 20 will display information that would be relevant to a consumer fitting those criteria. If the historical data changes over time, the messages displayed on display 20 will be dynamically selected based on the changing criteria. In this manner, display 20 is more likely to convey information relevant to a specific consumer rather than a random selection of content. The information contained in database 75 will be derived from proprietary historical research from sources including, but not limited to, retailers, manufacturers and independent researchers. It can be augmented over time by the continued collection and analysis of shopper demographic data in-store.

Information measured, gathered, stored and analyzed about the shoppers' habits can then be used by the retailer, manufacturer, or other third-party to follow up with sales and marketing efforts better targeted to the individual shopper. For example, a shopper may be measured to have looked only at certain items in any number of aisles or categories in a retail store; future marketing communications will be geared toward related and/or relevant products, services and accessories at that retailer or by other firms choosing to market to this individual.

Further, by using in-store historical data rather than historical data collected at a different location, the information contained in database 75 will be more targeted for a specific retailer.

Figure 4:
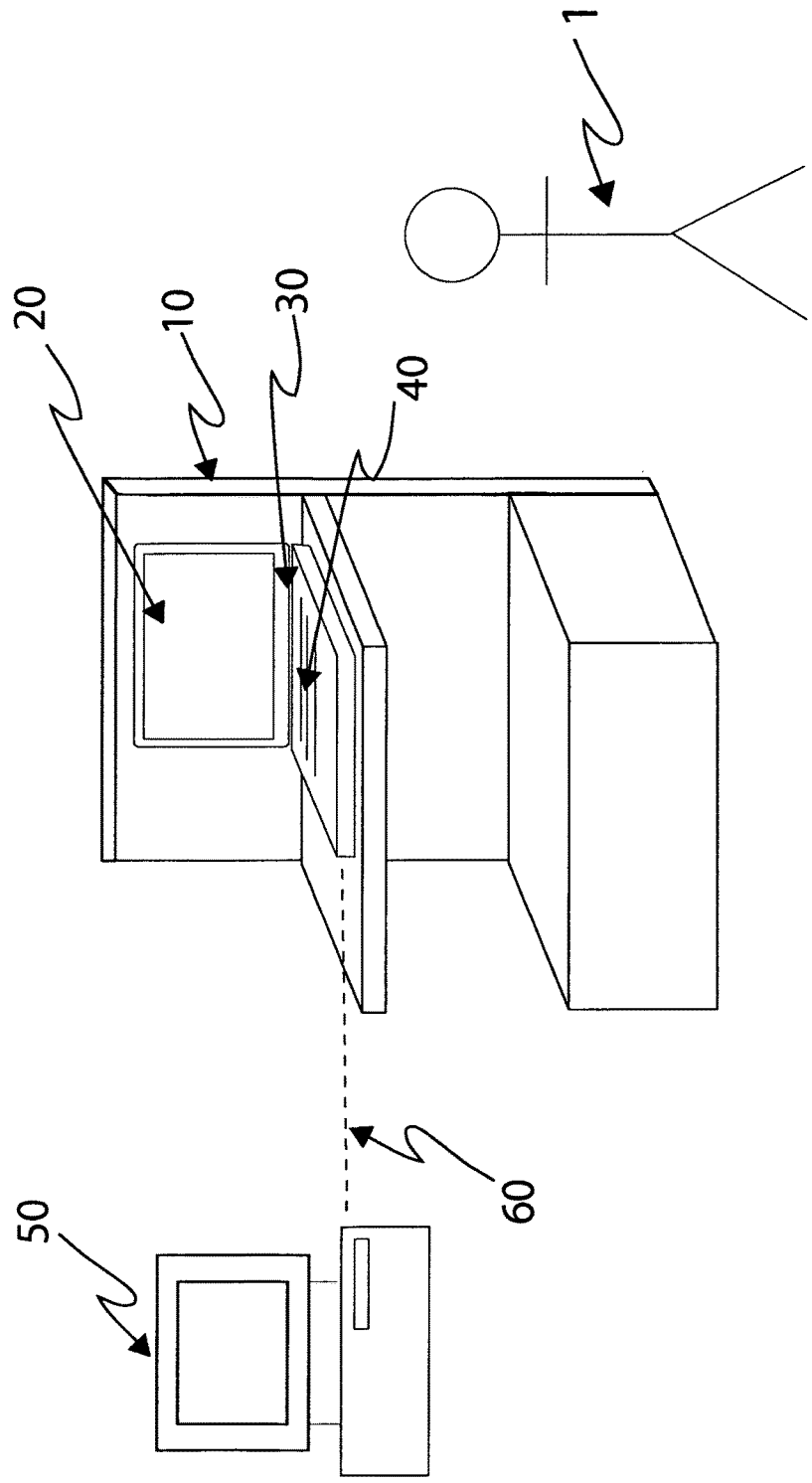
FIG. 4 shows a block diagram of an alternative embodiment of a display system in accordance with the invention.
Figure 5:
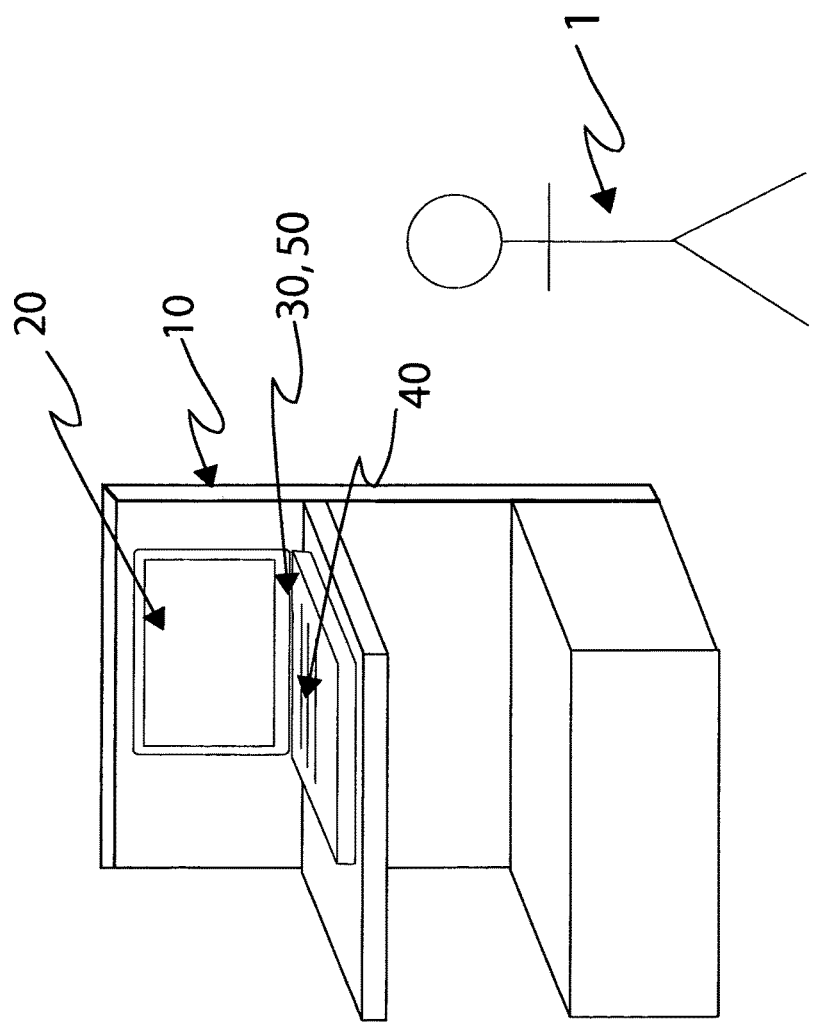
FIG. 5 shows a block diagram of an alternative embodiment of a display system in accordance with the invention.

From the embodiments of the invention described above, it should be understood that the present invention is not limited to those disclosed embodiments. Various changes and modifications thereof could be made by one of ordinary skill in the art without departing from the spirit or scope of the invention. So, by way of example, while a single display is shown in the disclosed embodiments for displaying information about the first and second products, a different display could be used to display information about the second product in the manner disclosed hereinabove. In such a scenario, the second display would be located at a position wherein its displayed messages could be read by a prospective purchaser who was proximate to the first display. Or, for that matter, the present invention is not limited to displaying information only about a second product. Indeed, it can be used to display information about one or more second products based on information gathered as described hereinabove. Alternative embodiments also include use of a laptop computer or desktop computer, monitor and input device to serve as both the product on display for sale or demonstration by the retailer and as the invention, itself, as depicted in FIG. 4 and FIG. 5.

What is claimed is:

1. A system comprising:
    a processor;
    a database comprising:
        pricing information for products at a physical retail location,
        advertising information, and
        historical information relating to shopping patterns of a shopper at said physical retail location, shopping patterns of multiple shoppers at various dates and times at said physical retail location, and shopping patterns of multiple shoppers at retail locations other than said physical retail location; and
    an electronic price tag removably mounted to shelving at said physical retail location comprising:
        an input device integrated into a display configured to receive a user input, and the display configured to display pricing information for a first product proximate to said electronic price tag, prompt the shopper for the user input when the shopper is within viewing distance of the electronic price tag, and display dynamic advertising information in response to receiving the user input,
    wherein the dynamic advertising information relates to a second product from said database based on the first product, the historical information and that the shopper at a particular time and date will meet a criteria.

2. The system as in claim 1, wherein said electronic price tag is configurable to simultaneously display said pricing information for said first product and said dynamic advertising information relating to said second product.

3. The system as in claim 1, wherein said second product is located at said physical retail location.

4. A method comprising:
    storing, in a database, pricing information for products at a physical retail location, advertising information, and historical information relating to shopping patterns of a shopper at said physical retail location, shopping patterns of multiple shoppers at various dates and times at said physical retail location, and shopping patterns of multiple shoppers at retail locations other than said physical retail location;

displaying, via an electronic price tag removably mounted to shelving at a physical retail location, the pricing information for a first product proximate to said electronic price tag;

prompting, via the display, the shopper for user input when the shopper is within viewing distance of the electronic price tag;

receiving, via an input device integrated into a display, the user input, and selectively displaying, via the display and in response to receiving the user input, dynamic advertising information relating to a second product from said database based on the first product, the historical information and that the shopper at a particular time and date will meet a criteria.

5. The method as in claim 4, wherein said selectively displaying comprises simultaneously displaying said pricing information for said first product and said dynamic advertising information relating to said second product.

6. The method as in claim 4, wherein said second product is located at said physical retail location.

7. An electronic price tag apparatus mounted to shelving at a physical retail location, the apparatus comprising:
a communication link for receiving at least:
pricing information for products at a physical retail location,
advertising information, and
historical information relating to shopping patterns of a shopper at said physical retail location, shopping patterns of multiple shoppers at various dates and times at said physical retail location, and shopping patterns of multiple shoppers at retail locations other than said physical retail location;

an input device integrated into a display configured for receiving a user input; and the display for displaying pricing information for a first product proximate to said electronic price tag, prompt the shopper for the user input when the shopper is within viewing distance of the electronic price tag, and display dynamic advertising information in response to receiving the user input, wherein the dynamic advertising information relates to a second product from said database based on the first product, the historical information and that the shopper at a particular time and date will meet a criteria.

8. The electronic price tag apparatus as in claim 7, wherein said electronic price tag display is configurable to simultaneously display said pricing information for said first product and said dynamic advertising information relating to said second product.

9. The electronic price tag apparatus as in claim 7, wherein said second product is located at said physical retail location.

* * * * *